United States Patent
Ahn

(12) 
(10) Patent No.: US 6,192,141 B1
(45) Date of Patent: Feb. 20, 2001

(54) APPARATUS AND METHOD FOR AUTOMATICALLY RECOGNIZING PRINT MEDIA

(75) Inventor: Byung-sun Ahn, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/019,203

(22) Filed: Feb. 5, 1998

(30) Foreign Application Priority Data

Feb. 5, 1997 (KR) .................................................... 97-3445

(51) Int. Cl.⁷ .............................. G06K 9/00; G01N 21/86
(52) U.S. Cl. ............... 382/112; 250/559.04; 250/559.11; 358/1.9
(58) Field of Search .............................. 382/112; 358/1.9, 358/1.13, 1.15, 502, 505; 250/559.01, 559.11

(56) References Cited

U.S. PATENT DOCUMENTS

| | | | |
|---|---|---|---|
| 5,121,468 | * | 6/1992 | Daino .................................. 358/1.15 |
| 5,123,757 | * | 6/1992 | Nagaoka et al. ..................... 358/1.15 |
| 5,128,879 | * | 7/1992 | Greve et al. ......................... 382/112 |
| 5,243,691 | * | 9/1993 | Kuwahara et al. ................. 358/1.13 |
| 5,488,223 | * | 1/1996 | Austin et al. ......................... 235/375 |
| 5,574,551 | * | 11/1996 | Kazaroff ................................. 399/45 |
| 5,693,931 | * | 12/1997 | Wade ................................... 250/205 |
| 5,711,621 | * | 1/1998 | Austin ............................. 400/120.13 |
| 5,774,146 | * | 6/1998 | Mizutani ................................ 347/43 |

* cited by examiner

Primary Examiner—Phuoc Tran
Assistant Examiner—Daniel G. Mariam
(74) Attorney, Agent, or Firm—Robert E. Bushnell, Esq.

(57) ABSTRACT

An apparatus and method that automatically recognizes a print medium. The device includes a print medium sensor for detecting the kind of print media, and outputting a detection signal; a detection signal processor for receiving and processing the detection signal output from the print medium sensor, and outputting a digital detection signal; and a microprocessor for receiving the digital detection signal processed and output from the detection signal processor, and determining the kind of print media according to the level of the digital detection signal applied.

14 Claims, 6 Drawing Sheets

APPARATUS AND METHOD FOR AUTOMATICALLY RECOGNIZING PRINT MEDIA

CLAIM OF PRIORITY

This application makes reference to, incorporates the same herein, and claims all benefits accruing under 35 U.S.C §119 from an application for Apparatus and Method for Automatically Recognizing Print Media earlier filed in the Korea Industrial Property Office on Feb. 5, 1997 and assigned Serial No. 3445/1997 by that Office.

FIELD OF THE INVENTION

The present invention relates to an apparatus and method for automatically recognizing a print media and more particularly, to an automatic print media recognition apparatus and method in which the print media is automatically recognized in a printer to thereby automatically set it in a printer driving program.

BACKGROUND OF THE INVENTION

A generally used printer sets a print media by executing a printer driving program in a host computer after the media is inserted. With other printing conditions determined, data generated from the host computer is processed into print image data, which is then transmitted to the printer.

After receiving the print image data processed in the host computer in accordance with the print media set and the printing conditions, the printer processes them, and prints on the print media. This control operation will be explained below with reference to FIGS. 1 and 2.

As shown in FIG. 1, using host computer 2, a user executes a user-designated program, such as wordprocessor or graphic editor program. When the designated program is executed, the user manipulates the program through the use of visual output on a display monitor 2-2. After this, the user processes the finished data into print image data, and outputs it to a printer via parallel port. The print image data received from host computer 2 are fed to a control ASIC (application specific integrated circuit) 3-2 via a buffer IC of an inkjet printer controller 3.

The print image data applied to control ASIC 3-2 are processed in a microprocessor 3-5. Here, microprocessor 3-5 executes font data stored in ROM 3-3 after its temporal storage, and outputs a print control signal. The print control signal output is sent to an inkhead driving IC (integrated circuit) 3-7 and motor driving IC 3-9 via control ASIC 3-2. The motor driving IC 3-9 which received the print control signal produces a motor rotation control signal according to the print control signal. The motor rotation control signal produced is applied to driving motor 4-3 of an inkjet printer mechanism 4, which is controlled by the signal.

The driving motor 4-3 receiving the motor rotation control signal provides a rotation force for feeding the print media stored in a paper feeding device (not shown), and laterally reciprocating the inkhead 4-1 that sprays ink onto the print media 1 to form an image, in accordance with the width of print media 1.

The inkhead 4-1 that laterally reciprocates by the rotation force of driving motor 4-3 is controlled by inkhead driving IC 3-7 so that ink is sprayed to write an image on print media 1. Specifically, the inkhead driving IC 3-7 receiving the print control signal produced from microprocessor 3-5 via control ASIC 3-2 produces an electric energy in accordance with the print control signal applied, and then sends it to inkhead 4-1 of ink print mechanism 4.

The inkhead 4-1 receiving the electric energy sprays ink so that printing is performed on print media 1. As shown in FIG. 2, inkhead 4-1 sprays ink in the direction of arrow A, and print media I is supplied in the direction of arrow B so that printing is carried out.

A sensor circuit 3-8 detects a signal that senses a paper feeding state or Jam phenomenon in a sensor (not shown) mounted on printer mechanism 4-2 of ink print mechanism 4, and the detection signal is applied to microprocessor 3-5 via control ASIC 3-2.

After receiving the detection signal, the microprocessor 3-5 processes it to generate a print control signal for a succeeding operation or a control signal for indicating Jam. Through this procedure, a user recognizes that a Jam occurs.

A method of setting print media 1 in the inkjet printer is explained below with reference to FIGS. 1 through 3.

As shown in FIG. 3, in printing step S1 the user generates data using the host computer 2 (in FIG. 1), and processes them into print image data. Then, in print media mounting step S2 the print media 1 (in FIG. 2) is placed in the printer.

After print media 1 is inserted, print media 1 is set in print media setting step S3. The user executes a printer driving program in host computer 2 so as to set print media 1 selected according to print image data. In printing condition setting step S4 printing conditions are set in a printer driving program. For instance, they include size of print media 1, printing direction, or automatic or manual print.

After the completion of those conditions, in print starting step S5 the print is started by the instructions from the host computer according to the printing conditions set. When printing starts, print media I is 7 supplied in print media feeding/conveying step S6, and performs printing with the bottom of inkhead 4-1 (in FIG. 2). After this procedure, inkhead 4-1 sprays ink in printing step S7, and thus forms an image on print media 1.

Such a printing job is performed after a printer driving program is executed in the host computer according to the kind of print media, and then it is set. For this reason, in a job that requires a variety of print media such as plain paper, coating paper or transparent film, the print media must be inconveniently set manually.

SUMMARY OF THE INVENTION

Therefore, in order to overcome such drawbacks of the prior art, an objective of the present invention is to provide an apparatus and method for automatically recognizing a print media in a printer driving program so that a print media condition is automatically set.

To accomplish the objective of the present invention, there is provided an apparatus for automatically recognizing a print medium. The apparatus has a print medium sensor for detecting the kind of print media, and outputting a detection signal; a detection signal processor for receiving and processing the detection signal output from the print medium sensor, and outputting a digital detection signal; and a microprocessor for receiving the digital detection signal processed and output from the detection signal processor, and determining the kind of print media according to the level of the digital detection signal applied.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, a preferred embodiment of the present invention will be described with reference to FIGS. 4 and 5.

Figure 4:
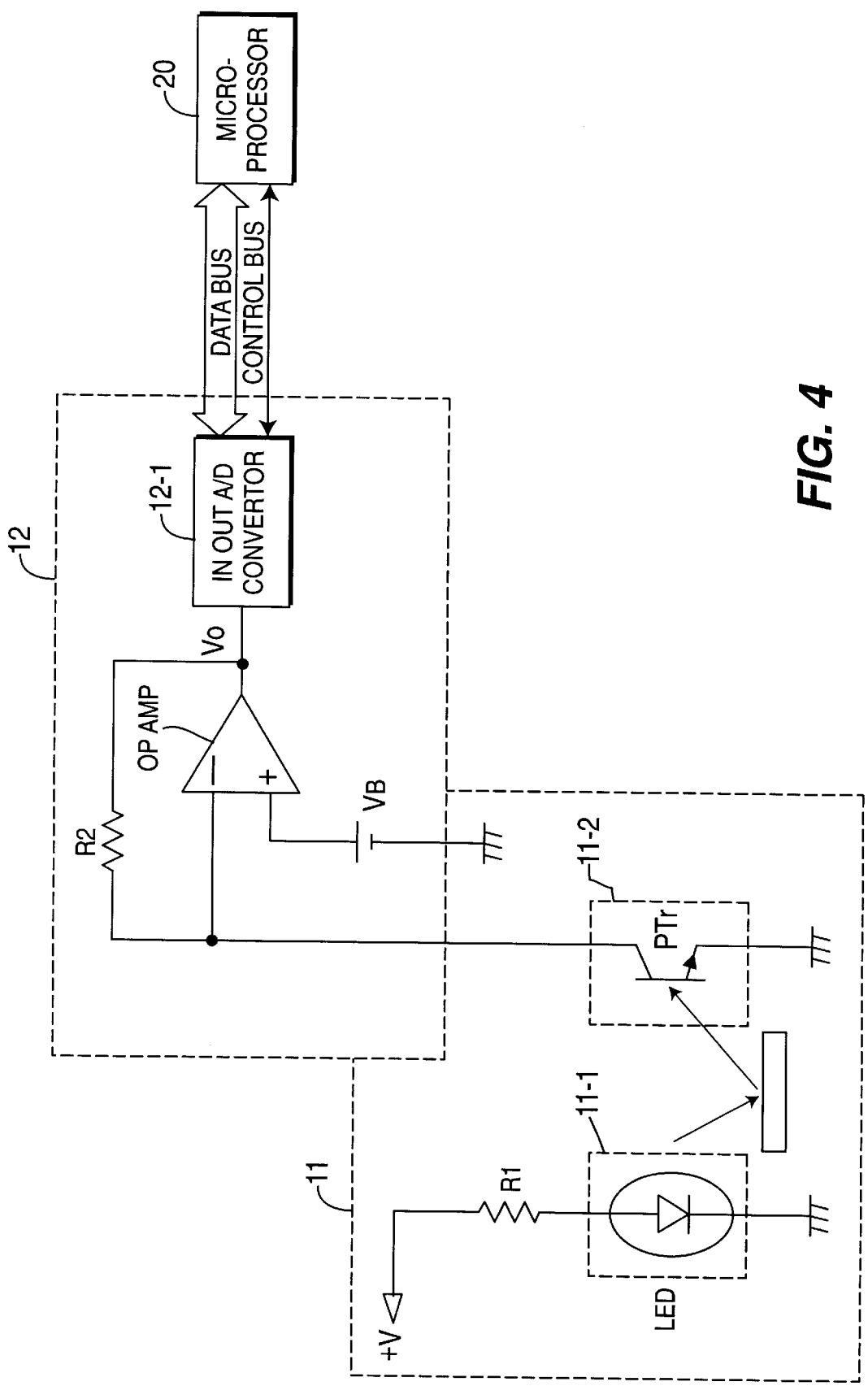
FIG. 4 is a circuit diagram showing a configuration of a print media detection device in accordance with the present invention.

Referring to FIG. 4, an automatic print media recognizing apparatus of the present invention has a print media detection sensor 11 for sensing the kind of print media, and outputting a detection signal. A detection signal processor 12 for receiving and processing the detection signal output from print media detection sensor 11, and outputting a digital detection signal, and a microprocessor 13 for receiving the digital detection signal output from the detection signal processor 12, and determining the kind of print media I according to the level of the digital detection signal applied.

In the construction, print media detection sensor 11 has a light emitting device 11 for receiving a direct-current voltage +V through a resistor in order to emit light, and a light receiving device 11-2 of a phototransistor PTr for detecting light emitted from device 11-1 and reflected on the surface of print media 1, and generating current according to the amount of light detected.

There are further provided an operational amplifier OP AMP for amplifying the current signal produced from light emitting device 11-2 of print media detection sensor 11, and an A/D converter 12-1 for converting the analog current signal amplified from the operational amplifier OP AMP into digital.

Figure 1:
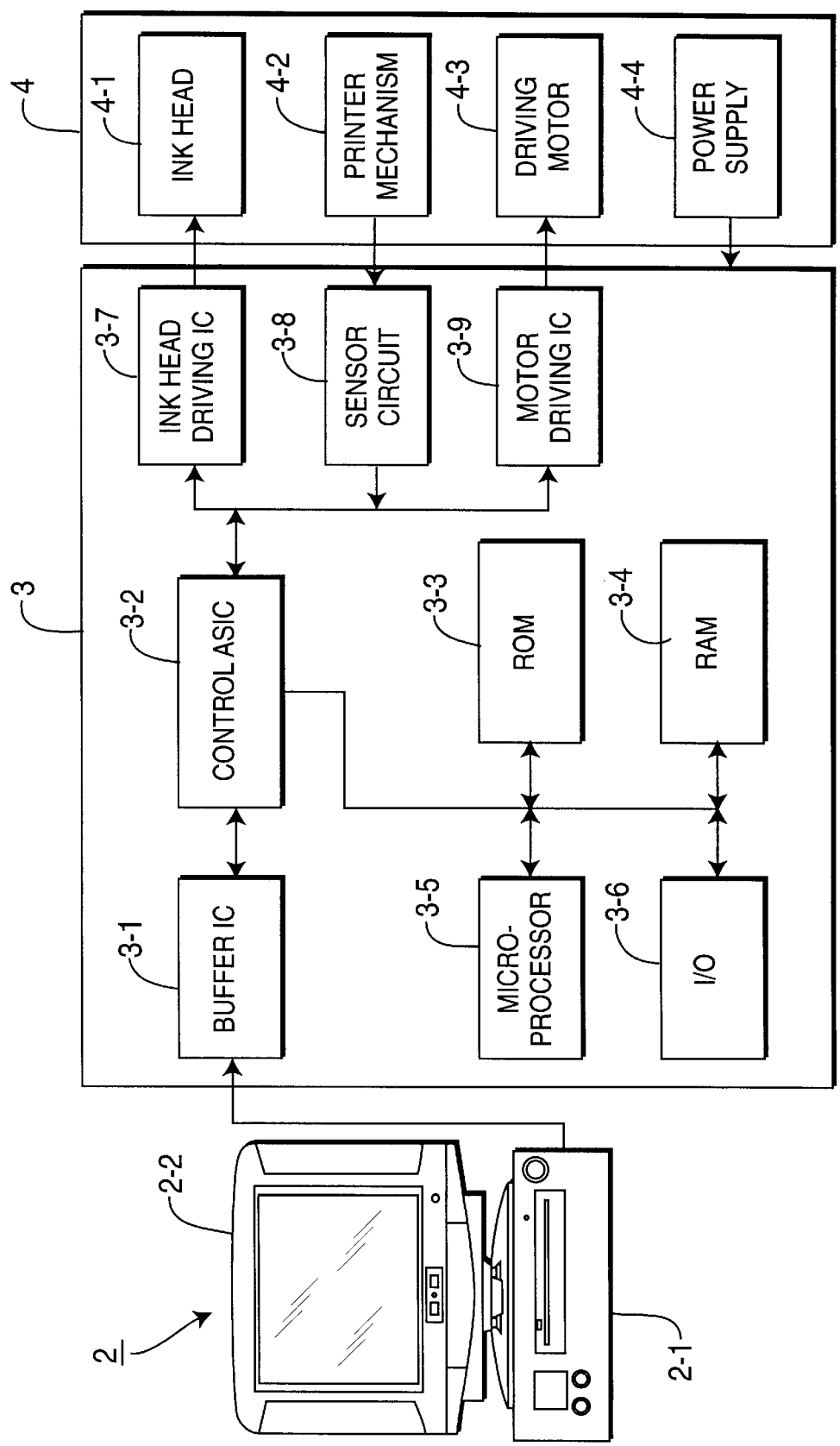
FIG. 1 is a block diagram of showing the internal circuit configuration of a conventional inkjet printer.
Figure 2:
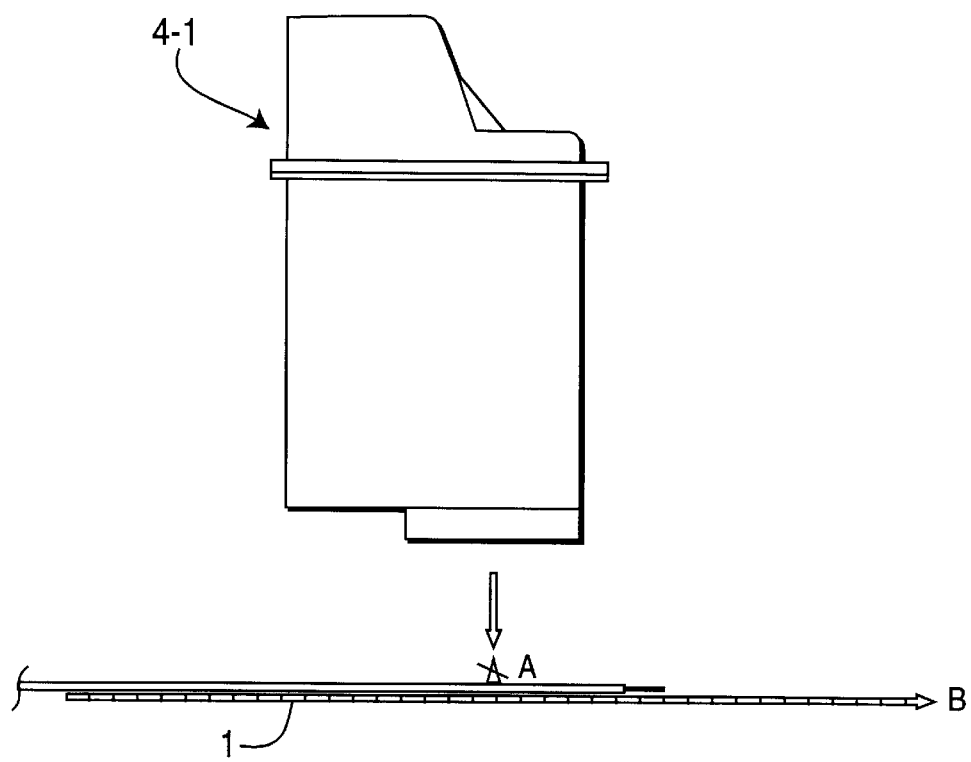
FIG. 2 is a diagram of showing the state of inkhead in which the printing operation of the inkhead of FIG. 1 appears.
Figure 3:
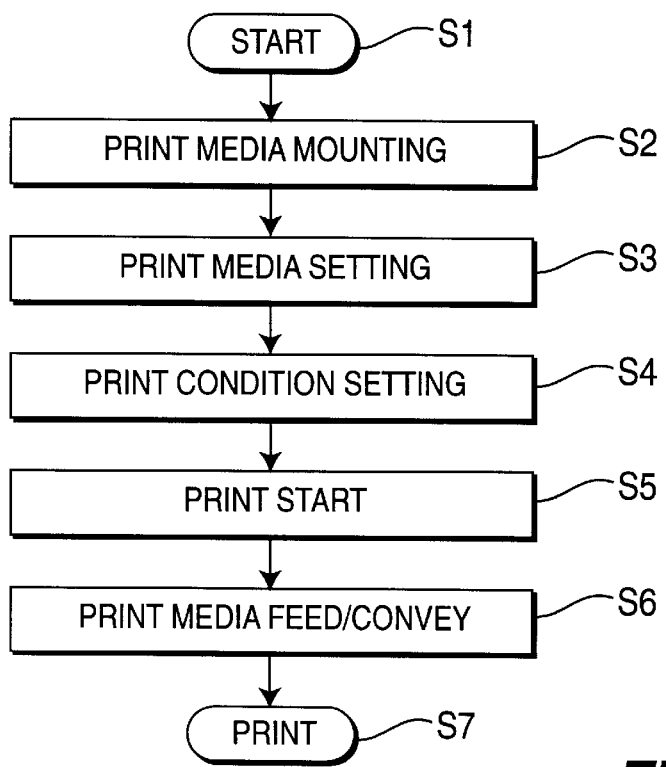
FIG. 3 is a flowchart of showing a print media setting method used in the prior art.
Figure 5:
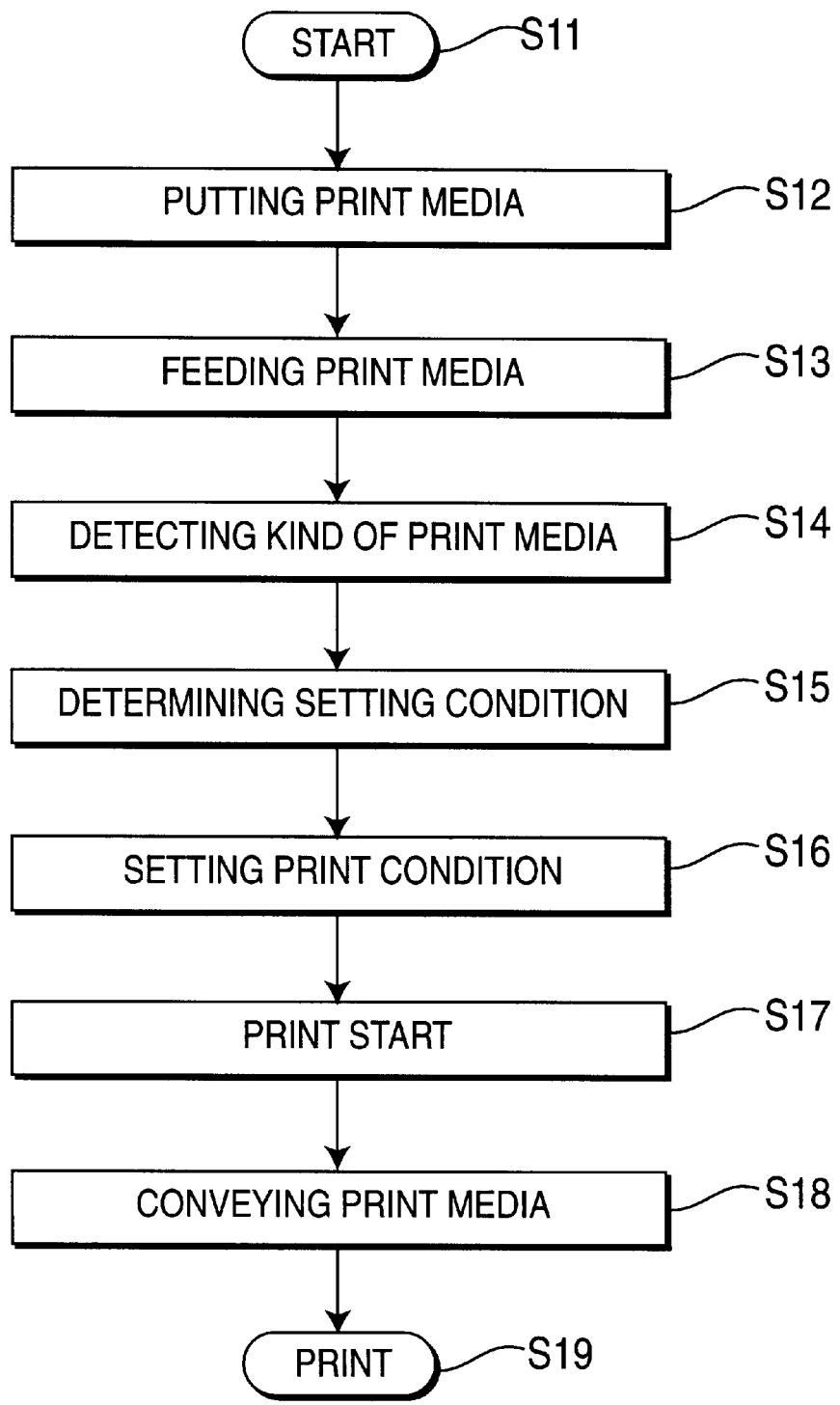
FIG. 5 is a flowchart showing a method of automatically setting a print media in accordance with the present invention.

Referring to FIG. 5, with such construction, a print media recognizing method has a step S11 of generating print data using a host computer (not shown), and converting the print data generated into print image. A step S12 of putting print media 1 (in FIG. 2) for writing the print image when the print 8 image data is produced in the step S11. A step S13 of feeding print media 1 when it is put to write the print image data in the step S12. A step S14 of detecting the kind of print media 1 when it is supplied in the step S13. A step S15 of determining the setting conditions of print media I when the kind of print media I is detected in the step 514. A step S16 of setting print conditions in accordance with print media I when the conditions of print media 1 is set in the step S15. A step S17 of starting print according to the conditions when they are set in the step 516. A step S18 of conveying print media I to the bottom of the inkhead (shown in FIG. 2) when printing starts in the step S17, and a step S19 of performing print when print media 1 is carried in the step S19.

The print media recognizing apparatus and method will be described below in more detail.

When a user executes an application program, for instance, wordprocessor or graphic editor program, in step S11, print data are created accordingly. This print data are processed into print image data. The data converted are transmitted to the printer.

Here, when the print image data is transmitted to the printer, it supplies print media I in step S13. When print media I is supplied, the kind of print media 1 supplied is detected in step S14.

As shown in FIG. 5, the light emitting device 11-1 of print media detection sensor 11 receives a direct-current voltage +V applied via resistor R1, and then projects light onto the surface of print media 1. The light irradiated on the surface of print media 1 has an intensity determined by the composition of particles of the surface of print media 1. In other words, on the surface of print media 1, the intensity of light reflected varies as in the following table 1.

| Kind of print media | Concentration (initial reference value) of print media | |
| --- | --- | --- |
| | white: 0.04 | black: 1.82 |
| plain | 0.06 | 0.11 |
| coating (dedicated to inkjet) | 0.05 | 0.1 |
| transparent film for inkjet | 0.11 | 1.86 |
| LBP transparent film | 0.1 | 1.77 |

For more specific explanation of table 1, the initial reference value of the concentration of print media 1 is 0.04 at the reference of white, and 1.82 at the reference of black. With the reference of the initial values, there are different concentrations each for plain paper used in an ordinary printer, coating paper and transparent film used exclusively for inkjet, and LBP transparent film used for laser beam printer. The transparent film varies with the color of its location in practical use so that the measurement must be actually taken for every product in its application.

Light is projected using the surface material of print media 1, and the intensity of light reflected is detected to be used as the reference of determining the kind of print media 1. The phototransistor PTr of print media detection sensor 11 for detecting the intensity of light projected from the LED and then reflected is turned on according to the intensity of light applied so that current is produced accordingly.

The current output is received and amplified in an operational amplifier OP AMP of detection signal processor 12. Given that the current produced at the collector of phototransistor PTr be I, and bias voltage $V_B$, the output voltage $V_O$, of the output port of operational amplifier OP AMP is calculated according to the equation $V_O = V_B + I*R_2$.

The output voltage $V_O$ output from operational amplifier OP AMP is input to input port "IN" of A/D converter 12-1, and sampled according to a reference clock so that it is converted from analog to digital. The detection signal converted into digital in A/D converter 12-1 of print media detection device 10 is applied to microprocessor 20 for controlling the printer's print mechanism according to the print image data applied from the host computer (not shown) through the output port "OUT".

Microprocessor 20 receives the detection signal via data bus in order to determine the kind of print media 1 detected. Here, detection signal processor 12 applies the detection signal to microprocessor 20 in response to the control signal output from microprocessor 20. When print media 1 is determined in microprocessor 20, it is automatically set according to the conditions of print media 1 detected in step S15. According to the kind of print media 1 shown in the table, microprocessor 20 sets the print conditions, and controls the print mechanism according to them.

When the conditions of print media 10 are set, the print conditions are determined according to the kind of print media 1 in step S16. That is, conditions such as the direction of print, print mode, print speed are set through the host computer. When this happens, the print image data are received through the host computer in step S17.

The printer that receives the print image data conveys print media 1 into the bottom of the inkhead in step S18. When print media 1 is carried into the bottom of the inkhead, the print media conditions and other print conditions are performed in step S19 to form an image on print media 1.

The configuration of the inkjet printer mechanism where the print media detection apparatus of the present invention is applied will be described below with reference to FIGS. 6, 7, and 8.

Figure 6:
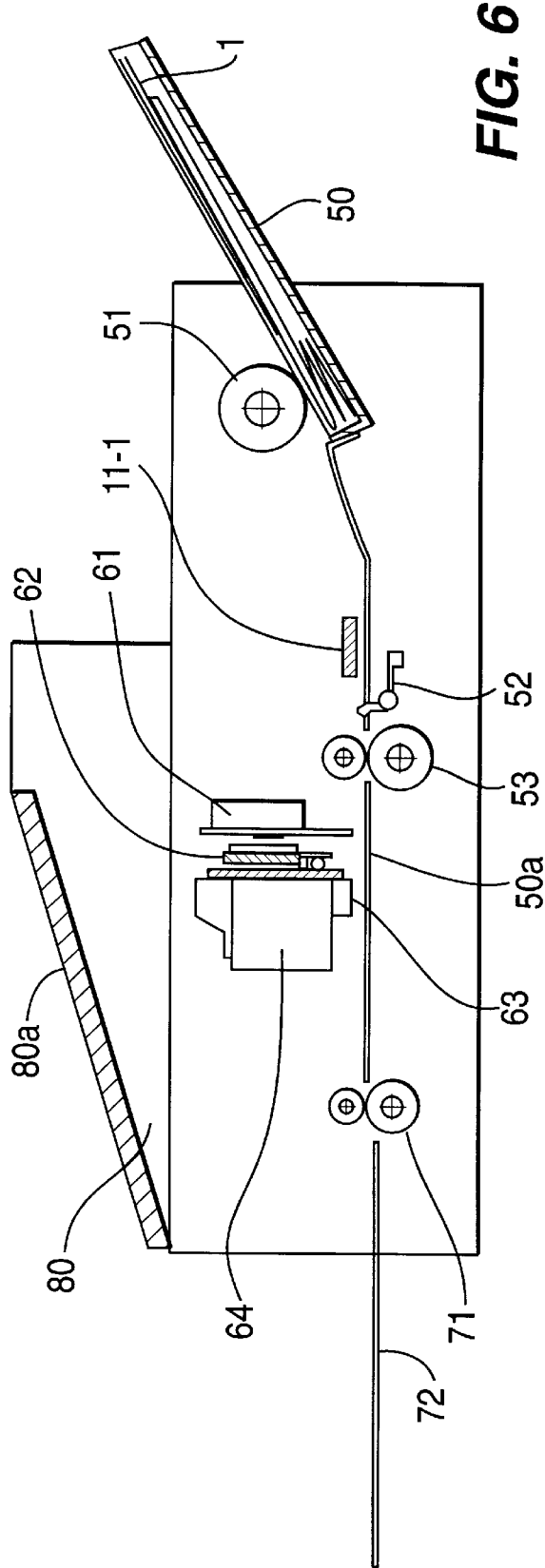
FIG. 6 is a side sectional view showing a configuration of an inkjet printer where the print media detection device of the present invention is applied.

As shown in FIG. 6, in the mechanism, a cassette 50 for storing print media 1 is installed at the rear, centering on an outer plate 80 for supporting the driving mechanism. In order to supply print media 1 stored in cassette 50, paper feeding roller 51 rotates and supplies it by means of surface friction.

The print media 1 supplied move along guide plate 50a of print media 1, and when it is supplied by means of the rotation force of paper feeding roller 51, the kind of print media 1 is determined by print media detection print media I is detected by print media detection sensor 11, the, signal detected is applied to microprocessor 20 (FIG. 5) so that the print conditions of print media 1 detected are set.

Figure 7:
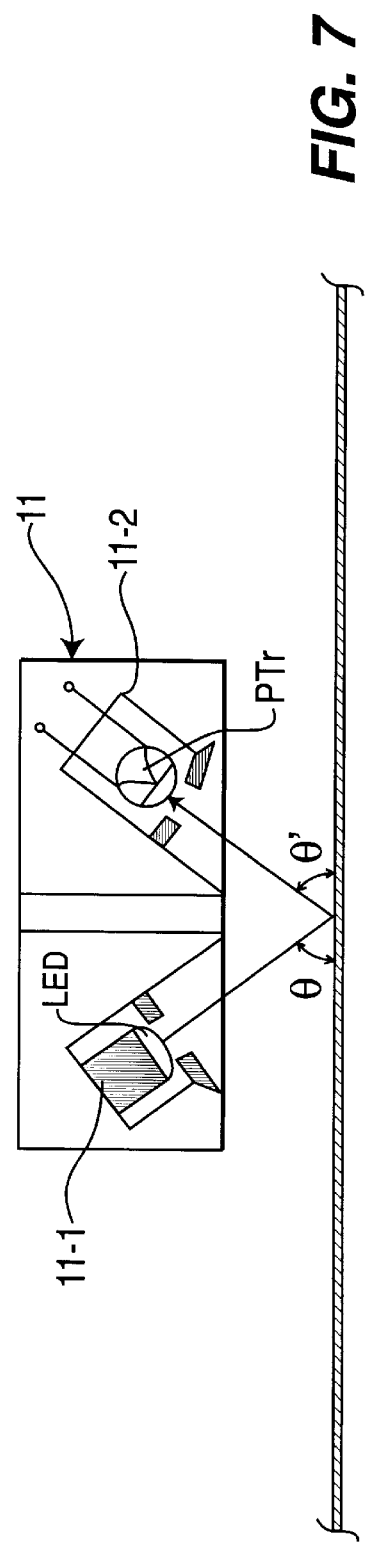
FIG. 7 is a diagram showing the operation of the print media detecting portion shown in FIG. 6.
Figure 8:
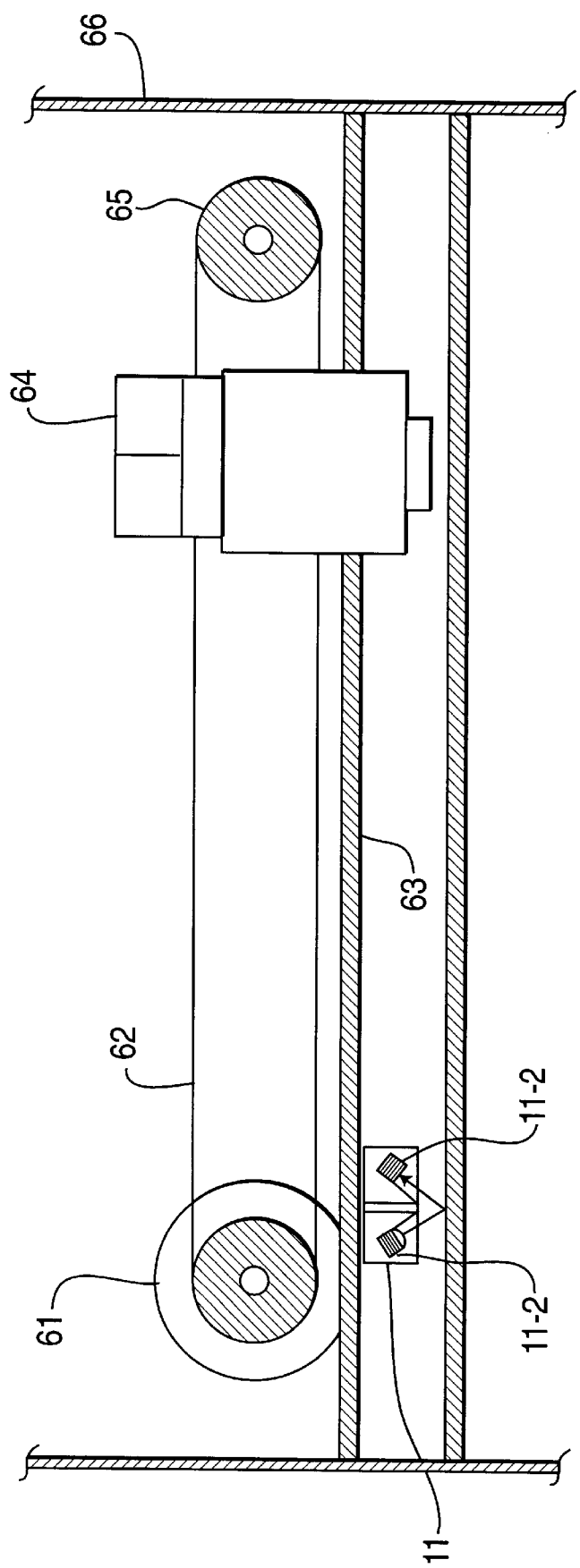
FIG. 8 is an enlarged front view of important components of the print mechanism shown in FIG. 6.

As in FIG. 7. the LED of device 11-1 of print media detection sensor 11 projects light onto the surface of print media 1 at an incident angle θ°, and the light projected on the surface of print media 1 is reflected at incident angle 0° and applied to the base of the phototransistor PTr of light receiving device 11-2. The phototransistor PTr of light receiving device 11-2 produces current according to the light applied and the current produced is converted into a digital signal through A/D converter 12-1 (in FIG. 5).

The light signal converted into digital determines print media 1 according to the amount of light in microprocessor 20. When the kind of print media I is determined, the conditions of mechanism of print media 1 are set. when print media 1 is detected by resistor sensor 52, the conditions, such as pressure and heat, of resistor roller 53 that applies a predetermined Pressure and beat to print media 1 are determined according to the kind of print media 1.

The ink spraying mechanism of inkhead 64 that sprays ink according to the kind of print media I determined is constructed as in FIG. 7 in such a manner that carriage motor 61 mounted on frame 66 produces a rotation force, and inkhead 64 is guided to carriage shaft 63 by the rotation force produced so that it laterally reciprocates along inkhead convey belt 62. Through such operation, inkhead 64 moves along the width. of print media 1, and sprays ink thereon for printing.

On completion of print, print media 1 is discharged to discharge tray 72 by the rotation force of discharge roller 71 along guide plate 50a. Therefore, for jobs requiring a variety of print media 1, the kind of print media I is automatically set using the print media detection sensor built in the printer, without change of print media 1's conditions by the worker.

As described above, the present invention determines the kind of print media using a print media sensor, and automatically sets the print conditions of print media. As a result, the user requiring a variety of print media is allowed not to change the print media's conditions manually.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. An apparatus, comprising:
    a print medium sensor automatically detecting the kind of print media, and outputting a detection signal according to an intensity of light reflecting from a surface of the print media, the intensity of light reflecting determined by the composition of particles of the surface of the print media;
    a detection signal processor receiving and processing the detection signal output from the print medium sensor, and outputting a digital detection signal; and
    a microprocessor receiving the digital detection signal processed and outputted from the detection signal processor, and determining the kind of print media according to the level of the digital detection signal applied, wherein the level includes one of the conditions of direction of print, print mode, and print speed, said microprocessor allowing said apparatus to accommodate automatic recognition of the print medium.

2. The apparatus of claim 1, wherein said print medium sensor comprising:
    a light emitting device receiving a direct-current voltage, and emitting light; and
    a light receiving device detecting the light emitted from the light emitting device and reflected on the surface of the print medium, and producing current according to the amount of light detected.

3. The apparatus of claim 2, wherein said detection signal processor comprising:
    an operational amplifier amplifying the current signal produced from said light emitting device; and
    an analog to digital (A/D) converter converting an analog current signal amplified in said operational amplifier into a digital signal, an output of said operational amplifier directly connected with an input of said analog to digital (A/D) converter.

4. A method, comprising the steps of:
    mounting the print medium when print image data are produced;
    feeding the print medium when it is mounted accommodating recording the print image data;
    automatically recognizing the kind of print medium when it is fed, according to an intensity of light reflecting from a surface of the print media, the intensity of light reflecting determined by the composition of particles of the surface of the print media, automatic recognition of the kind of print medium is performed by a print medium sensor having a light emitting device and a light receiving device, said light emitting device receiving a direct-current voltage, and emitting light; said light receiving device detecting the light emitted from the light emitting device and reflected on the surface of the print medium, and producing current according to the amount of light detected, the detected light from said light receiving device is processed in a detection signal processor outputting a digital detection signal, and determining the kind of print media according to the level of the digital detection signal applied, wherein the level includes one of the conditions of direction of print, print mode, and print speed;

determining setting conditions of the print medium when the kind of print medium is recognized;

setting print conditions in accordance with the print medium when the print medium conditions are set; and starting print when the print conditions are determined.

5. The apparatus of claim 2, wherein said light receiving device is coupled with an inverting connection of an operational amplifier, the operational amplifier amplifying a current signal from said print medium sensor.

6. The apparatus of claim 2, wherein said light emitting device projects light onto the surface of the print media at a predetermined incidence angle, and the light projected on the surface of the print media is reflected to said light receiving device at said predetermined incidence angle.

7. The apparatus of claim 3, wherein said operational amplifier has an output voltage equal to the sum of a bias voltage applied to an input of said operational amplifier and the product of a resistance of a negative feedback loop of said operational amplifier and a current from an electrically conducting channel of a phototransistor used as said light receiving device.

8. The method of claim 4, wherein said detection signal processor comprising:

an operational amplifier accommodating amplification of the current signal produced from said light emitting device; and an analog to digital (A/D) converter accommodating converting an analog current signal amplified in said operational amplifier into a digital signal, an output of said operation amplifier connected with an input of the analog to digital (A/D) converter.

9. The apparatus of claim 8, wherein said light receiving device is coupled with an inverting connection of said operational amplifier.

10. The apparatus of claim 9, wherein said light emitting device projects light onto the surface of the print media at a predetermined incidence angle, and the light projected on the surface of the print media is reflected to said light receiving device at said predetermined incidence angle.

11. The apparatus of claim 10, wherein said operational amplifier has an output voltage equal to the sum of a bias voltage applied to an input of said operational amplifier and the product of a resistance of a negative feedback loop of said operational amplifier and a current from an electrically conducting channel of a phototransistor used as said light receiving device.

12. An apparatus, comprising:

a light emitting device receiving a direct current voltage and emitting light, said light emitting device projects light onto any area of the surface of a print media at a predetermined incidence angle;

a light receiving device detecting the light emitted from said light emitting device and reflected on the surface of the print medium, and producing current according to the amount of light detected, and the light projected on the surface of the print media is reflected to said light receiving device at said predetermined incidence angle;

an operation amplifier accommodating amplifying a current signal produced from said light emitting device;

an analog to digital (A/D) converter accommodating converting an analog current signal amplified by said operation amplifier into a digital signal, an output of said operational amplifier connected with an input of said analog to digital (A/D) converter; and a microprocessor receiving the digital signal processed and outputted from said analog to digital (A/D) converter, and determining the kind of print media according to the level of the digital detection signal applied, wherein the level includes one of the conditions of direction of print, print mode, and print speed, said microprocessor allowing said apparatus to accommodate automatic recognition of the kind of print medium, the automatic recognition determined by the intensity of light received by said light receiving device.

13. The apparatus of claim 12, wherein said light receiving device is coupled with an inverting connection of said operational amplifier.

14. The apparatus of claim 13, wherein said operational amplifier has an output voltage equal to the sum of a bias voltage applied to an input of said operational amplifier and the product of a resistance of a negative feedback loop of said operational amplifier and a current from an electrically conducting channel of a phototransistor used as said light receiving device.

* * * * *